United States Patent
Sato et al.

(10) Patent No.: US 8,451,234 B2
(45) Date of Patent: May 28, 2013

(54) DISPLAY DEVICE WITH TOUCH PANEL

(75) Inventors: Hideo Sato, Hitachi (JP); Shigeyuki Nishitani, Mobara (JP); Teruaki Saito, Mobara (JP)

(73) Assignees: Japan Display East Inc., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1070 days.

(21) Appl. No.: 12/155,609

(22) Filed: Jun. 6, 2008

(65) Prior Publication Data

US 2009/0009486 A1    Jan. 8, 2009

(30) Foreign Application Priority Data

Jul. 3, 2007  (JP) ................. 2007-175050

(51) Int. Cl.
*G06F 3/041* (2006.01)
(52) U.S. Cl.
USPC .............. 345/173; 345/156; 178/18.01
(58) Field of Classification Search
USPC ............... 345/156–158, 173–178; 178/18.01, 178/18.03, 18.06
See application file for complete search history.

(56) References Cited

U.S. PATENT DOCUMENTS

| | | | |
|---|---|---|---|
| 3,958,234 A * | 5/1976 | Hoo | 345/182 |
| 5,225,959 A | 7/1993 | Stearns | |
| 5,283,556 A * | 2/1994 | Ise | 345/174 |
| 5,305,017 A * | 4/1994 | Gerpheide | 345/174 |
| 5,565,658 A | 10/1996 | Gerpheide et al. | |
| 5,861,583 A * | 1/1999 | Schediwy et al. | 178/18.06 |
| 5,905,489 A * | 5/1999 | Takahama et al. | 345/174 |
| 5,923,320 A * | 7/1999 | Murakami et al. | 345/179 |
| 6,075,520 A * | 6/2000 | Inoue et al. | 345/173 |
| 6,621,487 B2 * | 9/2003 | Iwasaki et al. | 345/173 |
| 6,781,577 B2 * | 8/2004 | Shigetaka | 345/173 |
| 2002/0011991 A1 * | 1/2002 | Iwasaki et al. | 345/173 |
| 2008/0198140 A1 * | 8/2008 | Kinoshita et al. | 345/173 |
| 2009/0315858 A1 * | 12/2009 | Sato et al. | 345/174 |

FOREIGN PATENT DOCUMENTS

JP         08-016307         6/1994

* cited by examiner

*Primary Examiner* — Jason Mandeville
(74) *Attorney, Agent, or Firm* — Stites & Harbison PLLC; Juan Carlos A. Marquez, Esq.; Nicholas B. Trenkle, Esq.

(57) ABSTRACT

A touch panel includes plural first electrodes extending in a first direction, plural second electrodes extending in a second direction different from the first direction, a driving circuit, a detection circuit, and a coordinate-position calculating circuit. The driving circuit sequentially selects two first electrodes out of the plural first electrodes, supplies a high potential voltage higher than a reference voltage to one of the selected two first electrodes, and supplies the reference voltage to the other, the detection circuit detects a capacitance difference (A–B) between a capacitor A between a selected one of the second electrodes and the first electrode to which the high potential voltage is supplied and a capacitor B between the selected second electrode and the first electrode to which the reference voltage is supplied, and the coordinate-position calculating circuit calculates a touch position on the touch panel touched by the observer on the basis of positions of the selected first and second electrodes and the capacitance difference (A–B).

19 Claims, 14 Drawing Sheets

DISPLAY DEVICE WITH TOUCH PANEL

The present application claims priority from Japanese applications JP2007-175050 filed on Jul. 3, 2007, the content of which is hereby incorporated by reference into this application.

BACKGROUND OF THE INVENTION

1. Field of the Invention

The present invention relates to a display device with touch panel, and, more particularly to a display device with touch panel having an electrostatic capacitance coupling type touch panel function that is capable of detecting plural touch positions touched by an observer.

2. Description of Related Art

In recent years, according to the spread of mobile apparatuses, a touch panel technique for supporting a "user friendly" graphical user interface is becoming important.

As the touch panel technique, an electrostatic capacitance coupling type touch panel is known. As the electrostatic capacitance coupling type touch panel, a touch panel that detects plural touch positions touched by an observer is known (see JP-A-8-16307).

In the touch panel disclosed in JP-A-8-16307, a demultiplexer and a multiplexer are provided around a tablet, the demultiplexer and the multiplexer is sequentially switched to detect coupling capacitances of an electrode line in an X direction and an electrode line in a Y direction and detect coordinates of plural touch positions touched by the observer.

SUMMARY OF THE INVENTION

However, in a method of sequentially switching the demultiplexer and the multiplexer as in the touchpanel disclosed in JP-A-8-16307, the coupling capacitances of the electrode line in the X direction and the electrode line in the Y direction are small. Therefore, resolution cannot be increased.

The present invention has been devised in order to solve the problem in the related art and it is an object of the present invention to make it possible to cancel parasitic capacitance, detect smaller inter-electrode capacitance, and provide a high-resolution touch panel having a larger number of electrodes.

The above and other objects and new characteristics of the present invention are made apparent by the description of this specification and the attached drawings.

Among inventions disclosed in the application, overviews of representative ones are briefly explained below.

(1) A display device with touch panel including a display panel and an electrostatic capacitance coupling type touch panel arranged on a surface on an observer side of the display panel, the touch panel including plural first electrodes extending in a first direction, plural second electrodes extending in a second direction different from the first direction, a driving circuit, a detection circuit, and a coordinate-position calculating circuit that calculates a touch position on the touch panel touched by the observer, wherein the driving circuit sequentially selects two first electrodes out of the plural first electrodes, supplies a high potential voltage higher than a reference voltage to one of the selected two first electrodes, and supplies the reference voltage to the other, the detection circuit detects a capacitance difference (A−B) between a capacitor A between a selected one of the second electrodes and the first electrode to which the high potential voltage is supplied and a capacitor B between the selected second electrode and the first electrode to which the reference voltage is supplied, and the coordinate-position calculating circuit calculates a touch position on the touch panel touched by the observer on the basis of positions of the selected first and second electrodes and the capacitance difference (A−B).

(2) In (1), the selected two first electrodes are adjacent two of the first electrodes.

(3) In (1) or (2), the detection circuit has an integration circuit, and the integration circuit integrates a current difference between an electric current flowing through the capacitor A and an electric current flowing through the capacitor B and outputs a voltage proportional to the capacitance difference (A−B).

(4) In (3), the detection circuit sequentially selects the second electrodes in a time division manner, and the integration circuit integrates a current difference between an electric current flowing through a capacitor A between the sequentially selected second electrodes and the first electrode to which the high potential voltage is supplied and an electric current flowing through a capacitor B between the sequentially selected second electrodes and the first electrode to which the reference voltage is supplied and outputs a voltage proportional to the capacitance difference (A−B).

(5) In (3), the detection circuit simultaneously selects the plural second electrodes, the integration circuit is provided for each of the plural second electrodes, and each of the integration circuits integrates a current difference between an electric current flowing through a capacitor A between the second electrode corresponding to each of the integration circuits and the first electrode to which the high potential voltage is supplied and an electric current flowing through a capacitor B between the second electrode corresponding to each of the integration circuits and the first electrode to which the reference voltage is supplied and outputs a voltage proportional to the capacitance difference (A−B).

(6) A display device with touch panel including a display panel and an electrostatic capacitance coupling type touch panel arranged on a surface on an observer side of the display panel, the touch panel including plural first electrodes extending in a first direction, plural second electrodes extending in a second direction different from the first direction, a driving circuit, a detection circuit, and a coordinate-position calculating circuit that calculates a touch position on the touch panel touched by the observer, wherein the driving circuit sequentially selects, in a period A, two first electrodes out of the plural first electrodes, supplies a high potential voltage higher than a reference voltage to one of the selected two first electrodes, and supplies the reference voltage to the other and sequentially selects, in a period B, two second electrodes out of the plural second electrodes, supplies the high potential voltage higher than the reference voltage to one of the selected two second electrodes, and supplies the reference voltage to the other, the detection circuit detects, in the period A, a capacitance difference (A−B) between a capacitor A between each of the second electrodes and the first electrode to which the high potential voltage is supplied and a capacitor B between each of the second electrodes and the first electrode to which the reference voltage is supplied and detects, in the period B, a capacitance difference (C−D) between a capacitor C between each of the first electrodes and the second electrode to which the high potential voltage is supplied and a capacitor D between each of the first electrodes and the second electrode to which the reference voltage is supplied, and the coordinate-position calculating circuit calculates a touch position on the touch panel by the observer on the basis of the selected first electrode and the capacitance difference (A−B) and the selected second electrode and the capacitance difference (C−D).

(7) In (6), the two first electrodes selected in the period A are adjacent two of the first electrodes and the two second electrodes selected in the period B are adjacent two of the second electrodes.

(8) In (6) or (7), the detection circuit has an integration circuit, and the integration circuit integrates, in the period A, a current difference between an electric current flowing through the capacitor A and an electric current flowing through the capacitor B and outputs a voltage proportional to the capacitance difference (A−B) and integrates, in the period B, a current difference between an electric current flowing through the capacitance C and an electric current flowing through the capacitor D and outputs a voltage proportional to the capacitance difference (C−D).

(9) A display device with touch panel including a display panel and an electrostatic capacitance coupling type touch panel arranged on a surface on an observer side of the display panel, the touch panel including plural first electrodes extending in a first direction, plural second electrodes extending in a second direction different from the first direction, a first electrode selection circuit, a second electrode selection circuit, a detection circuit, and a coordinate-position calculating circuit that calculates a touch position on the touch panel touched by the observer, wherein the first electrode selection circuit sequentially selects, in a period A, two first electrodes out of the plural first electrodes, supplies a high potential positive polarity pulse having a voltage level higher than a reference voltage to one of the selected two first electrodes, and supplies a low potential negative polarity pulse having a voltage level lower than the reference level to the other, the second electrode selection circuit sequentially selects, in a period B, two second electrodes out of the plural second electrodes, supplies a high potential positive polarity pulse having a voltage level higher than the reference voltage to one of the selected two second electrodes, and supplies a low potential negative polarity pulse having a voltage level lower than the reference voltage to the other, the detection circuit detects, in the period A, a capacitance difference (A−B) between a capacitor A between each of the second electrodes and the first electrode to which the positive polarity pulse is supplied and a capacitor B between each of the second electrodes and the first electrode to which the negative polarity pulse is supplied and detects, in the period B, a capacitance difference (C−D) between a capacitor C between each of the first electrodes and the second electrode to which the positive polarity pulse is supplied and a capacitor D between each of the first electrodes and the second electrode to which the negative polarity pulse is supplied, and the coordinate-position calculating circuit calculates a touch position on the touch panel by the observer on the basis of the selected first electrode and the capacitance difference (A−B) and the selected second electrode and the capacitance difference (C−D).

(10) In (9), the two first electrodes selected in the period A are adjacent two of the first electrodes and the two second electrodes selected in the period B are adjacent two of the second electrodes.

(11) In (9), the two first electrodes selected in the period A are the first electrode serving as a reference and the other first electrode and the two second electrodes selected in the period B are the second electrode serving as a reference and the other second electrode.

(12) In any one of (9) to (11), the first electrode selection circuit supplies the reference voltage to each of the first electrodes in the period B, and the second electrode selection circuits supplies the reference voltage to each of the second electrodes in the period A.

(13) In any one of (9) to (12), the detection circuit has an integration circuit, and the integration circuit integrates, in the period A, a current difference between an electric current flowing through the capacitor A and an electric current flowing through the capacitor B and outputs a voltage proportional to the capacitance difference (A−B) and integrates, in the period B, a current difference between an electric current flowing through the capacitor C and an electric current flowing through the capacitor D and outputs a voltage proportional to the capacitance difference (C−D).

(14) In any one of (3) to (5), (8), and (13), the detection circuit has an A/D conversion circuit connected to a post stage of the integration circuit.

(15) In any one of (1) to (14), each of the first electrodes has a wide electrode pattern between the adjacent two second electrodes, and each of the second electrodes has a wide electrode pattern between the adjacent two first electrodes.

(16) In any one of (1) to (15), the display device is an IPS type liquid crystal display device.

An effect obtained by representative ones among the inventions disclosed in this application is that, according to the present invention, it is possible to cancel parasitic capacitance, detect smaller inter-electrode capacitance, and provide a high-resolution touch panel having a larger number of electrodes.

DESCRIPTION OF THE PREFERRED EMBODIMENTS

Figure 1:
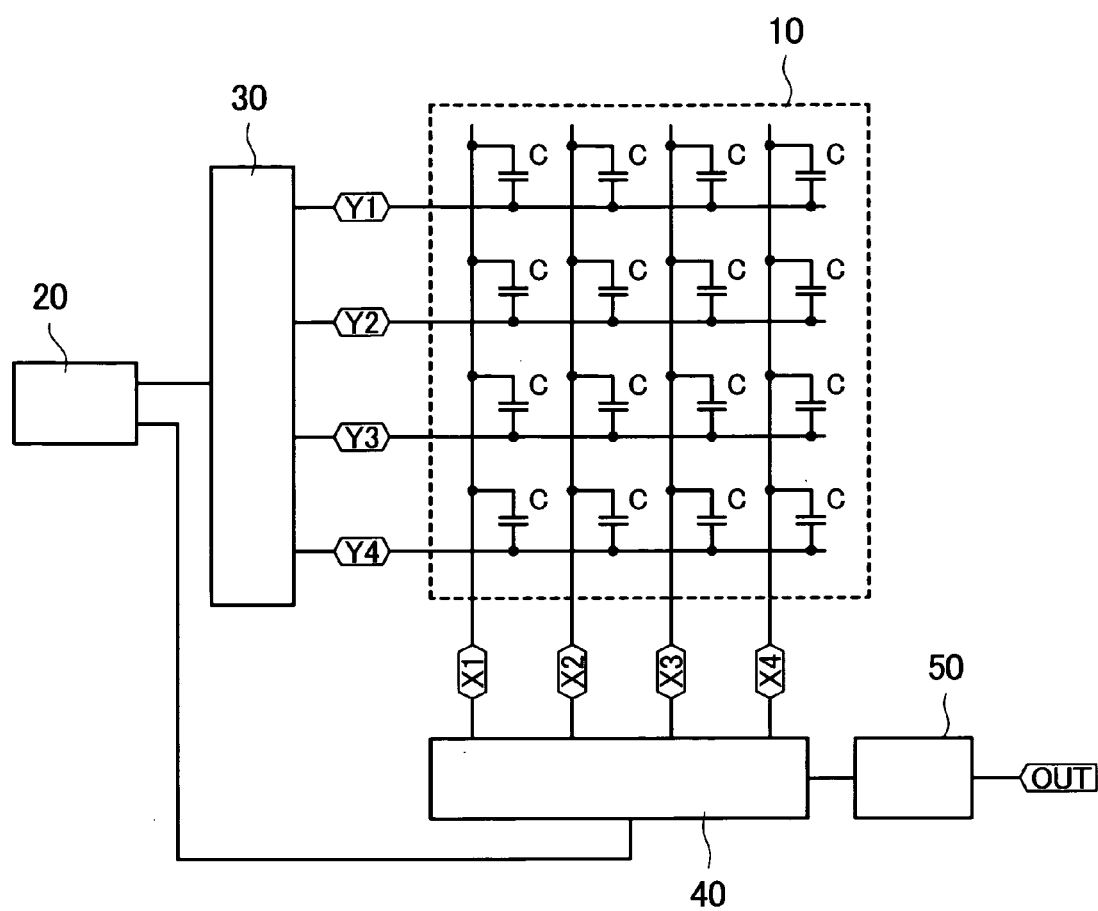
FIG. 1 is a block diagram showing the schematic structure of a touch panel used in a liquid crystal display device with touch panel according to a first embodiment of the present invention.

Embodiments of the present invention are explained in detail below with reference to the accompanying drawings.

In all the figures for explaining the embodiments, components having identical functions are denoted by identical reference numerals and signs and redundant explanation of the components is omitted.

First Embodiment

FIG. 1 is a block diagram showing the schematic structure of a touch panel used in a liquid crystal display device according to a first embodiment of the present invention.

In FIG. 1, reference numeral 10 denotes a touch sensor, 20 denotes a control circuit, 30 denotes a Y driving circuit, 40 denotes an X detection circuit, and 50 denotes a coordinate detection circuit. X1 to X4 denote X electrodes extending in a first direction (a Y direction in FIG. 1), Y1 to Y4 denote Y electrodes extending in a second direction (an X direction in FIG. 1), and C denotes coupling capacitors formed between the respective X electrodes and the respective Y electrodes.

Figure 2:
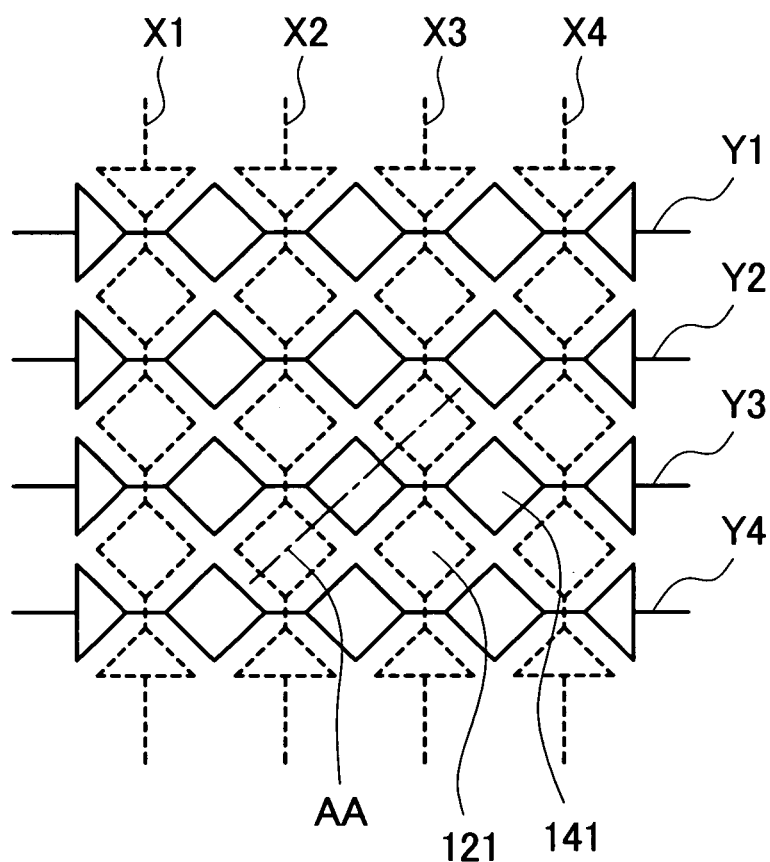
FIG. 2 is a diagram showing electrode shapes of X electrodes and Y electrodes shown in FIG. 1.

FIG. 2 is a diagram showing electrode shapes of the X electrodes and the Y electrodes shown in FIG. 1. As shown in FIG. 2, the X electrodes X1 to X4 have wide electrode patterns 121 among the Y electrodes Y1 to Y4. The Y electrodes Y1 to Y4 have wide electrode patterns 141 among the X electrodes X1 to X4.

Figure 3:
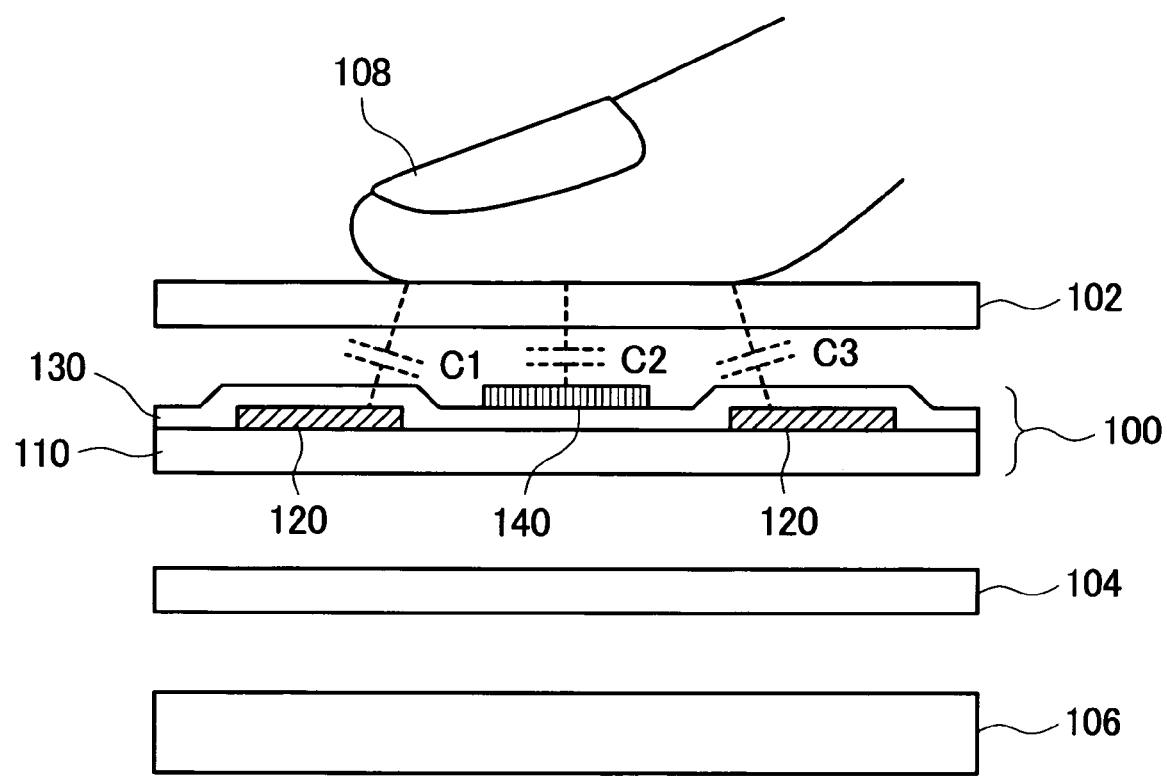
FIG. 3 is a block diagram showing the schematic structure of the liquid crystal display device with touch panel according to the first embodiment of the invention.

FIG. 3 is a sectional view showing a liquid crystal display device with touch panel according to this embodiment in which the touch panel shown in FIG. 1 is used.

In FIG. 3, reference numeral 100 denotes a touch sensor, 102 denotes a cover, 104 denotes a liquid crystal display device, 106 denotes a backlight, and 108 denotes a finger of an observer. The touch sensor 100 includes a substrate (e.g., a glass substrate) 110, X electrodes 120 formed on the substrate 110, an insulating layer 130 formed on the X electrodes 120, and a Y electrode 140 formed on the insulating layer 130. In the schematic structure shown in FIG. 3, capacitors C1 and C3 are formed between the finger 108 of the observer and the X electrodes 120 and a capacitor C2 is formed between the finger 108 of the observer and the Y electrode 140.

In FIG. 3, the touch sensor 100 is shown in the sectional structure along a cut line AA in FIG. 2. In FIG. 3, the liquid crystal display device 104 is a liquid crystal display device of an IPS type, a liquid crystal display device of a TN type, or a liquid crystal display device of a VA type.

Figure 4:
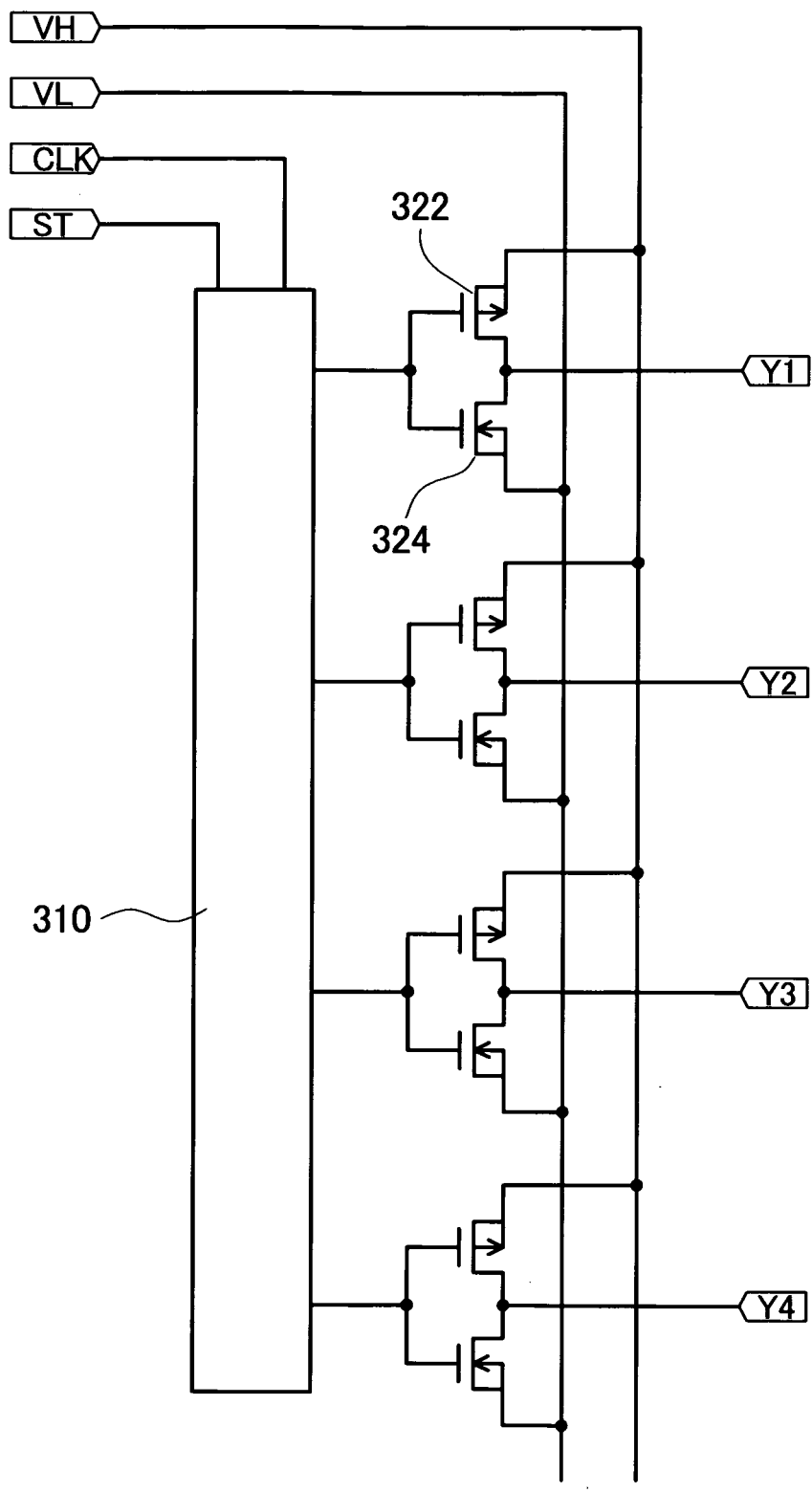
FIG. 4 is a diagram showing a Y driving circuit shown in FIG. 1.

FIG. 4 is a diagram showing the Y driving circuit 30 shown in FIG. 1.

As shown in FIG. 4, the Y driving circuit 30 has a shift register 310. When outputs of respective shift stages of the shift register 310 change to High (hereinafter referred to as H level), pMOS transistors 322 are turned off, nMOS transistors 324 is turned on, and a reference voltage (here, a voltage VL) is supplied to the Y electrodes Y1 to Y4.

When outputs of the respective shift stages of the shift register 310 change to Low (hereinafter referred to as L level), the pMOS transistors 322 are turned on, nMOS transistors 324 are turned off, and a high potential voltage (here, a voltage VH) higher than a reference voltage is supplied to the Y electrodes Y1 to Y4.

Figure 5:
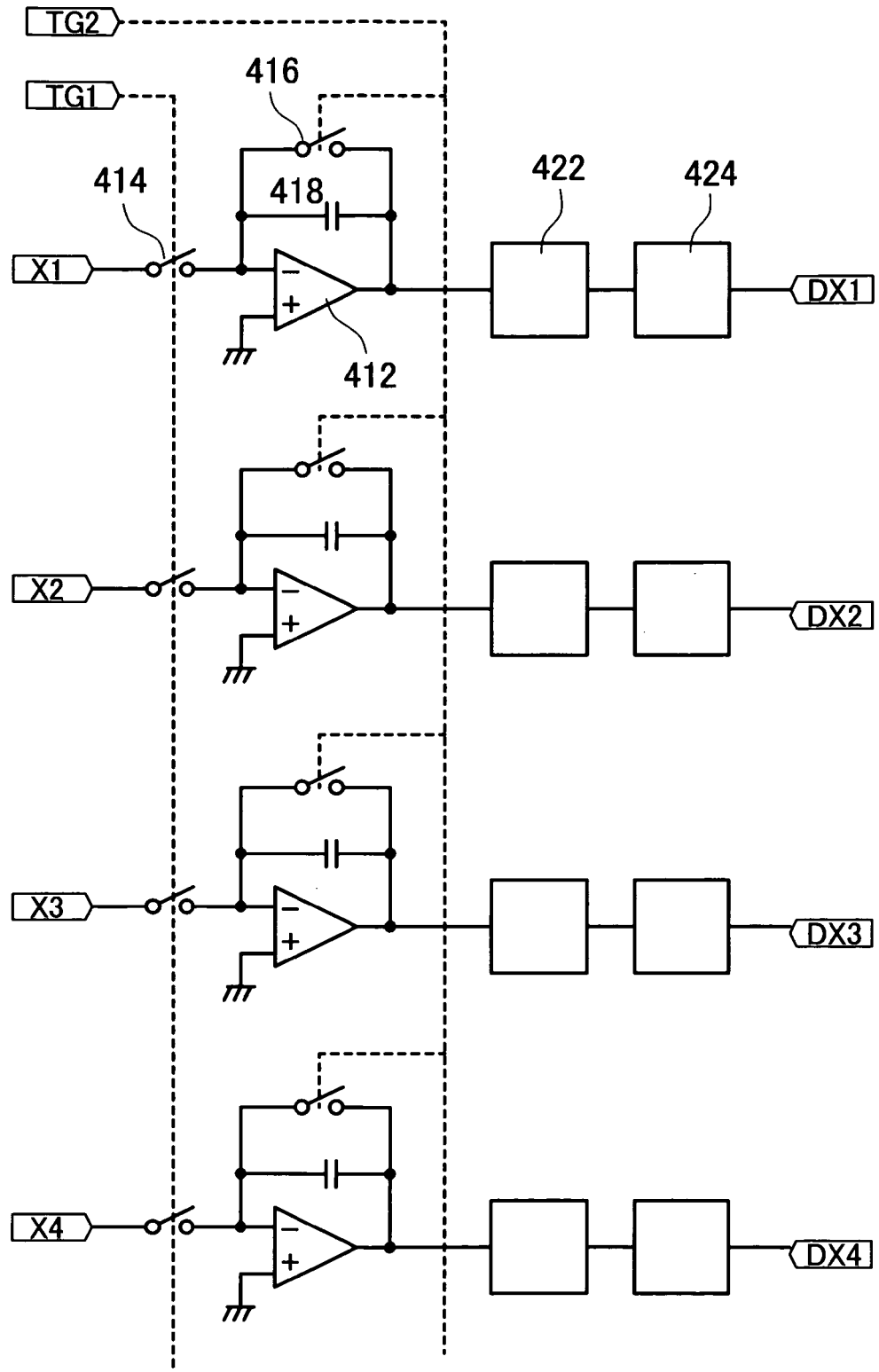
FIG. 5 is a diagram showing an X detection circuit shown in FIG. 1.

FIG. 5 is a diagram showing an X detection circuit 40 shown in FIG. 1.

As shown in FIG. 5, the X detection circuit 40 has integration circuits including operational amplifiers 412 and integral capacitors 418. Sample hold circuits 422 and A/D conversion circuits 424 are provided at post stages of the integration circuits.

The integration circuits integrate, when the switching elements 414 are on, electric currents flowing to the X electrodes X1 to X4 when a voltage supplied to the Y electrodes Y1 to Y4 changes from the H level to the L level or from the L level to the H level. The integral capacitors 418 of the integration circuits are reset when switching elements 416 are on.

Figure 6:
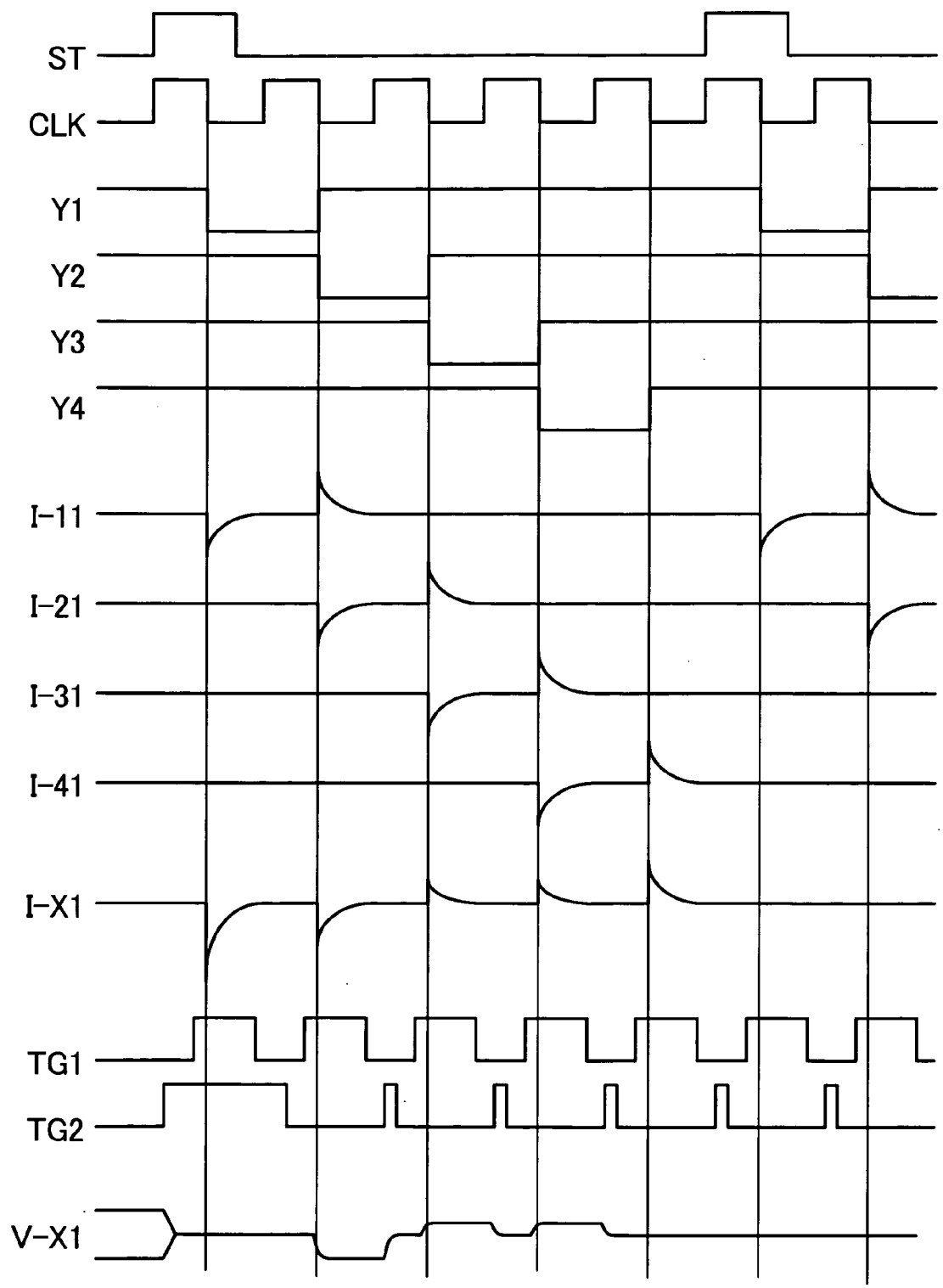
FIG. 6 is a timing chart for explaining operations of the touch panel shown in FIG. 1.

FIG. 6 is a timing chart for explaining operations of the touch panel shown in FIG. 1.

A start pulse ST and a clock CLK are inputted to the shift register 310 of the Y driving circuit 30. The shift register 310 sequentially supplies an L level voltage to the Y electrodes Y1 to Y4.

When a voltage at the Y electrodes Y1 to Y4 changes from the H level to the L level and when the voltage changes from the L level to the H level, electric currents flow from the Y electrodes Y1 to Y4 to the X electrodes X1 to X4, respectively.

The electric currents are detected by the X electrodes. For example, electric currents indicated by I-11, I-21, I-31, and I-41 in FIG. 6 flow from the Y electrodes Y1 to Y4 to the X electrode X1. As a result, an electric current indicated by I-X1 in FIG. 6, which is a sum of the electric currents, flows to the X electrode X1. When the electric current is integrated by the integration circuit, a voltage indicated by V-X1 in FIG. 6 can be detected. The switching elements 414 are turned on by a timing pulse TG1 and the switching elements 416 are turned on by a timing pulse TG2.

In this embodiment, when coupling capacitances of the X electrodes and the Y electrodes are the same, electric currents flowing to the X electrodes flow in opposite directions and have the same magnitude when a voltage at the Y electrode Y1 changes from the L level to the H level and when a voltage at the Y electrode Y2 changes from the H level to the L level. Therefore, output voltages of the integration circuits are 0. However, when coupling capacitances of the X electrodes and the Y electrodes are different, electric currents flowing to the X electrodes flow in opposite directions and have magnitudes different according to a capacitance difference when the voltage at the Y electrode Y1 changes from the L level to the H level and when the voltage at the Y electrode Y2 changes from the H level to the L level. Therefore, output voltages of the integration circuits are voltages other than 0.

The integration circuits integrate current values detected in the X electrodes. Therefore, output voltages of the integration circuits are proportional to a capacitance difference between coupling capacitances of the X electrodes and the Y electrodes.

The coordinate detection circuit 50 detects a coordinate of a touch position on the touch sensor 10 touched by the finger of the observer according to positions of the Y electrodes to which the L level voltage is supplied and the current values detected in the X electrodes. In this case, in this embodiment, plural touch positions touched by the observer can be detected.

In this way, in this embodiment, a capacitance difference between coupling capacitances of the X electrodes and the Y electrodes is detected and a coordinate position on the touch sensor 10 touched by the finger of the observer is detected.

Therefore, it is possible to cancel parasitic capacitance between the X electrodes and the Y electrodes.

As a result, in this embodiment, it is possible to detect a position touched by the finger of the observer without being affected by fluctuation in parasitic capacitance between the X electrodes and the Y electrodes due to fluctuation in an arrangement caused in manufacturing and without being affected by fluctuation in parasitic capacitance between the X electrodes and the Y electrodes due to an external factor such as temperature.

In general, coupling capacitances of the X electrodes and the Y electrodes at the time when the finger of the observer touches the touch sensor 10 decrease as the number of electrodes of the X electrodes and the Y electrodes increases. However, in this embodiment, since parasitic capacitance between the X electrodes and the Y electrodes is cancelled and smaller coupling capacitances of the X electrodes and the Y electrodes can be detected, it is possible to realize a high-resolution touch panel having a larger number of electrodes.

In the above explanation, the integration circuits in the X detection circuit 40 are provided for the respective X electrodes to simultaneously detect electric currents flowing through the X electrodes. However, it is also possible to provide only one integration circuit in the X detection circuit 40 and sequentially detect, for the respective X electrodes, electric currents flowing through the X electrodes in a time division manner. A configuration of the X detection circuit 40 in that case is shown in FIG. 7.

Figure 7:
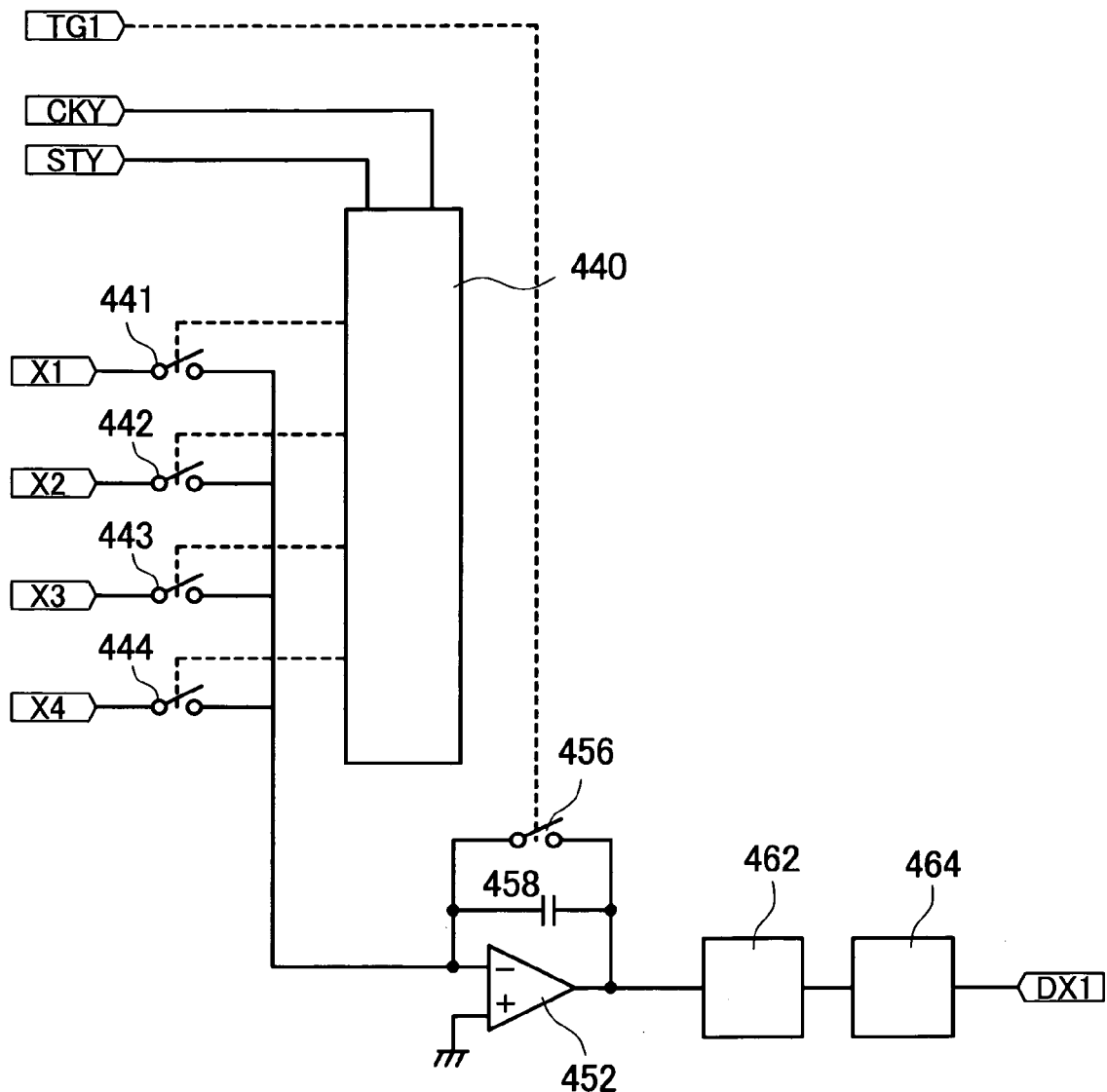
FIG. 7 is a diagram showing a modification of the X detection circuit shown in FIG. 5.

In the configuration shown in FIG. 7, the X detection circuit 40 has a shift resister 440. A start pulse (STY) and a clock (CKY) are inputted to the shift register 440. The shift register 440 sequentially turns on switching elements 441 to 444 in a time division manner and inputs electric currents flowing through the respective X electrodes to an integration circuit. The integration circuit including an operational amplifier 452 and an integral capacitor 458 sequentially integrates electric currents flowing to the X electrodes in a time division manner.

A switching element 456 is turned on by a timing pulse TG1. The integral capacitance 458 is reset when the switching element 456 is on. In FIG. 7, reference numeral 462 denotes a sample hold circuit and 464 denotes an A/D conversion circuit.

Second Embodiment

Figure 8:
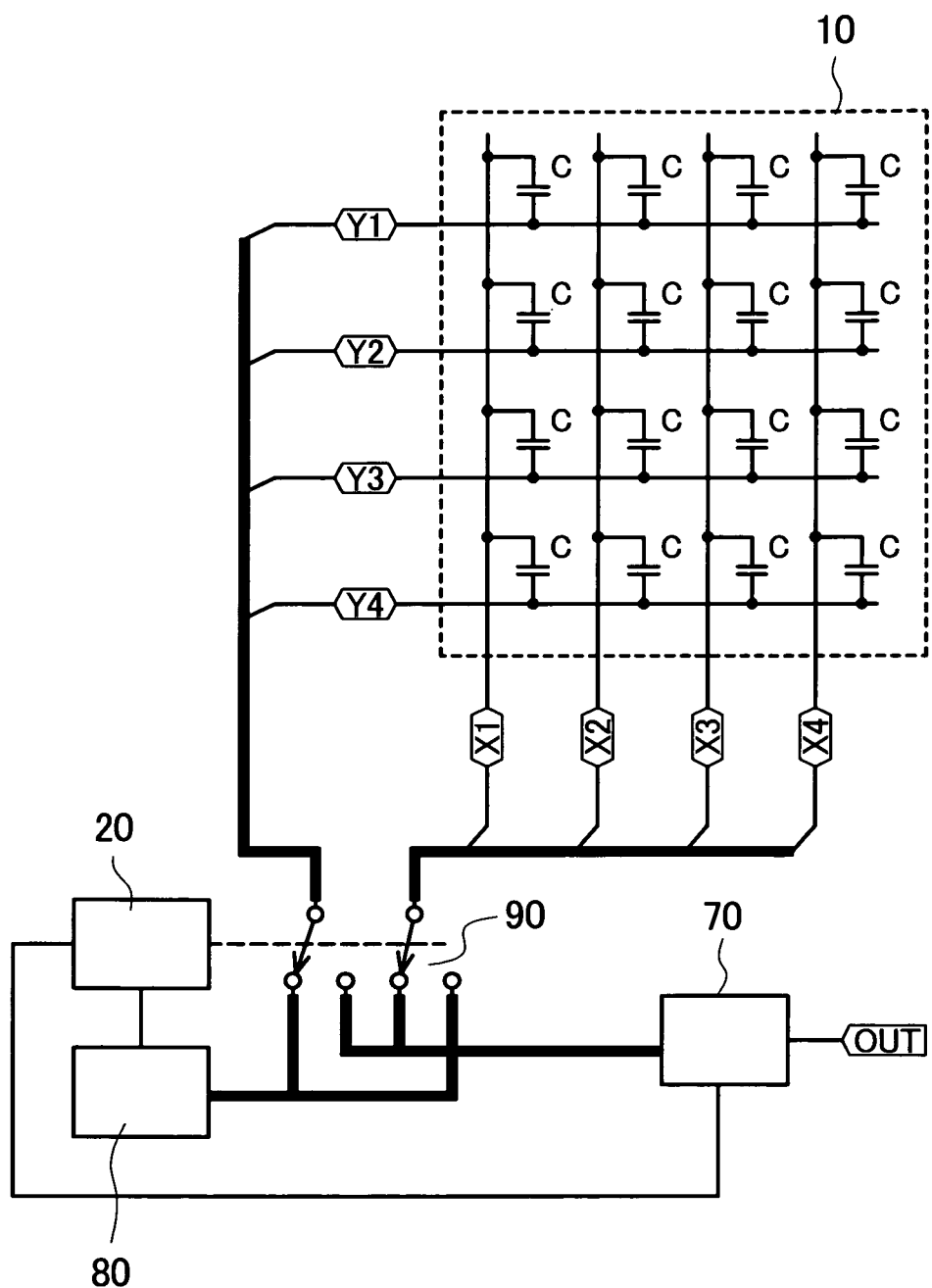
FIG. 8 is a block diagram showing the schematic structure of a touch panel used in a liquid crystal display device with touch panel according to a second embodiment of the present invention.

FIG. 8 is a block diagram showing the schematic structure of a touch panel used in a liquid crystal display device according to a second embodiment of the present invention.

In FIG. 8, reference numeral 10 denotes a touch sensor, 20 denotes a control circuit, 70 denotes a current detection circuit, and 80 denotes an electrode driving circuit.

In the first embodiment, the L level voltage is sequentially supplied to the respective Y electrodes in a time division manner and electric currents flowing to the respective X electrodes are detected to detect a coordinate position However, in the second embodiment, the control circuit 20 controls a switch 90 and, in a period A, the electrode driving circuit 80 sequentially supplies the L level voltage to the respective Y electrodes in a time division manner and the current detection circuit 70 detects electric currents flowing to all X electrodes and, in a period B, the electrode driving circuit 80 sequentially supplies the L level voltage to the respective X electrodes in a time division manner and the current detection circuit 70 detects electric currents flowing to all Y electrodes. Although a coordinate detection circuit is provided at a post stage of the current detection circuit 70, the coordinate detection circuit is not shown in FIG. 8.

In this embodiment, in the period A, current values detected in all the X electrodes are proportional to a capacitance difference between coupling capacitance between one of continuous two Y electrodes and all the X electrodes and coupling capacitance between the other of the continuous two Y electrodes and all the X electrodes.

Therefore, in the period A, it is possible to detect a position of the Y electrodes on the touch sensor 10 touched by the finger of the observer. Similarly, in the period B, it is possible to detect a position of the X electrodes on the touch sensor 10 touched by the finger of the observer according to currents values detected in all the Y electrodes.

Consequently, it is possible to detect a coordinate of a touch position on the touch sensor 10 touched by the finger of the observer. In this case, in this embodiment, it is possible to detect plural touch positions touched by the observer.

Figure 9:
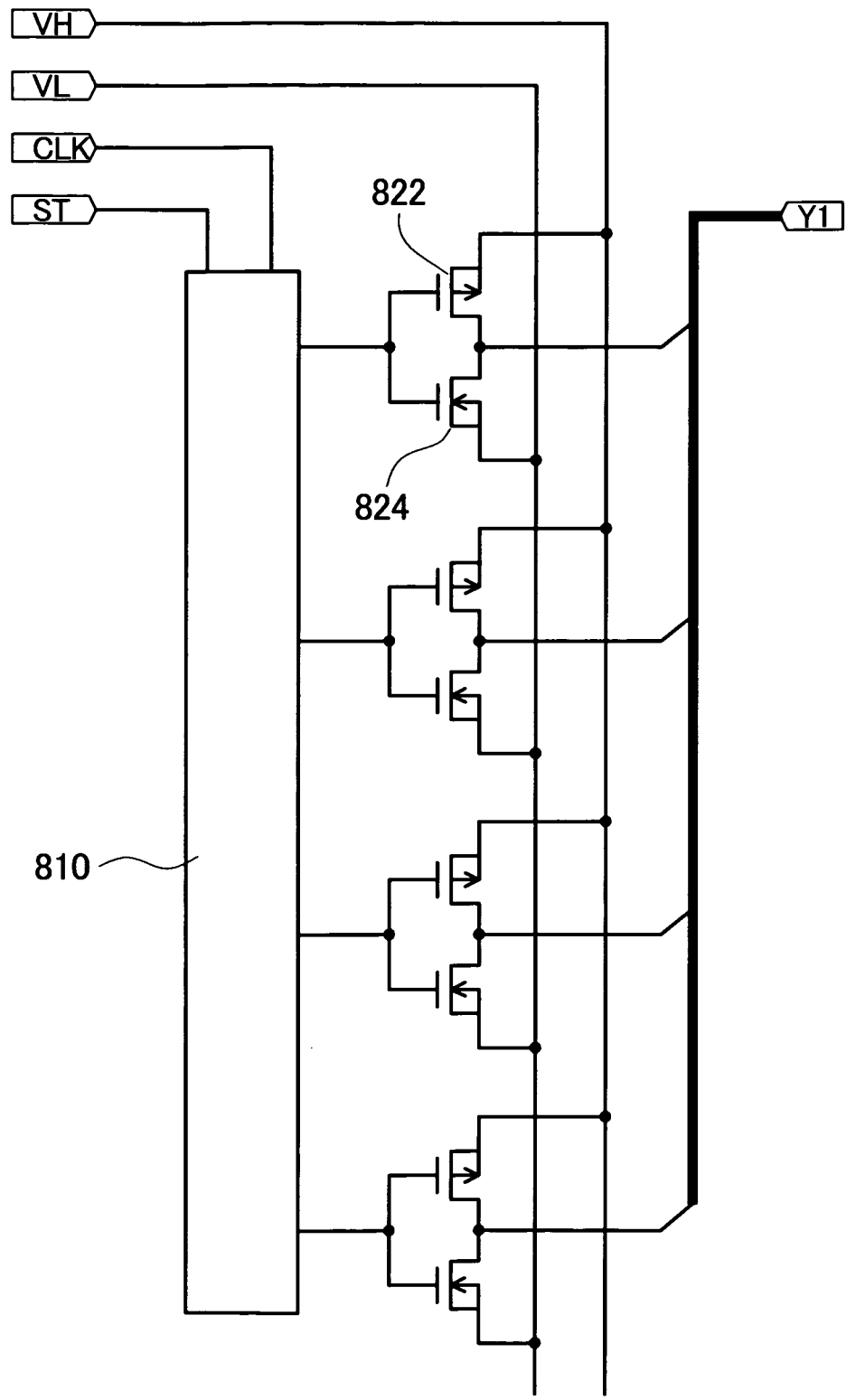
FIG. 9 is a diagram showing an electrode driving circuit shown in FIG. 8.

FIG. 9 is a diagram showing an example of the electrode driving circuit 80 shown in FIG. 8.

In FIG. 9, reference numeral 810 denotes a shift register, 822 denotes pMOS transistors, and 824 denotes nMOS transistors. In FIG. 9, a bold line indicates buss connection. A circuit configuration of the electrode driving circuit 80 shown in FIG. 9 is the same as that of the Y driving circuit 30 shown in FIG. 4.

Figure 10:
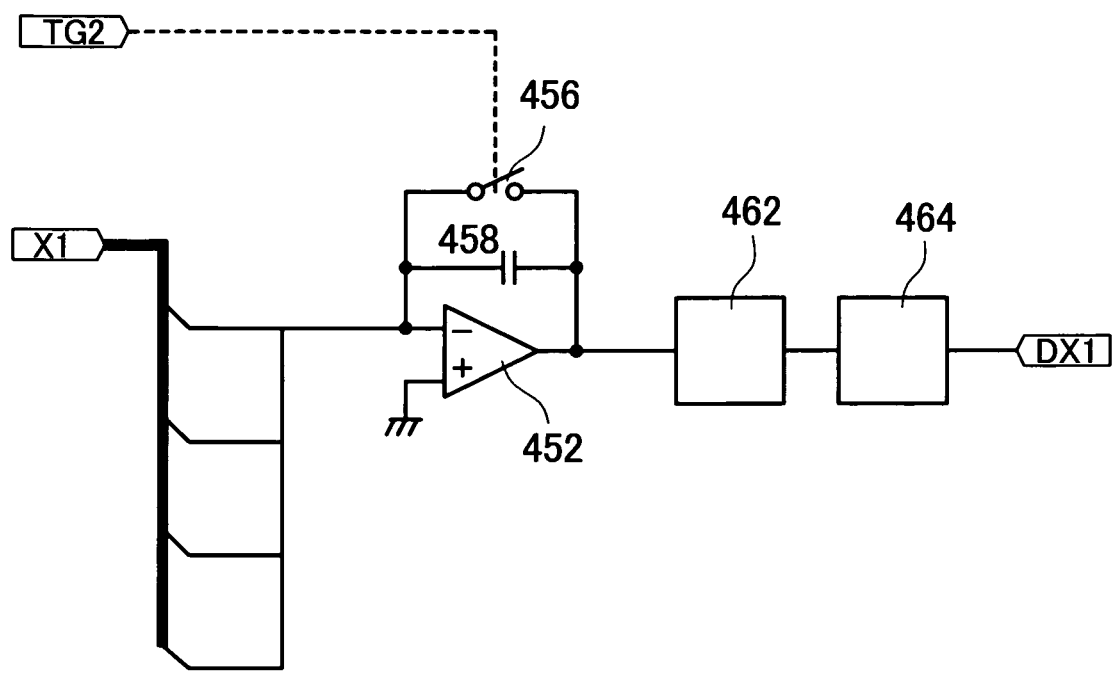
FIG. 10 is a diagram showing a current detection circuit shown in FIG. 8.

FIG. 10 is a diagram showing an example of the current detection circuit 70 shown in FIG. 8. In FIG. 10, as in FIG. 9, a bold line indicates buss connection. The current detection circuit shown in FIG. 10 is different from the X detection circuit shown in FIG. 7 in that electric currents flowing through all electrodes (X electrodes or Y electrodes) are detected. Otherwise, the current detection circuit is the same as the X detection circuit shown in FIG. 7.

Third Embodiment

Figure 11:
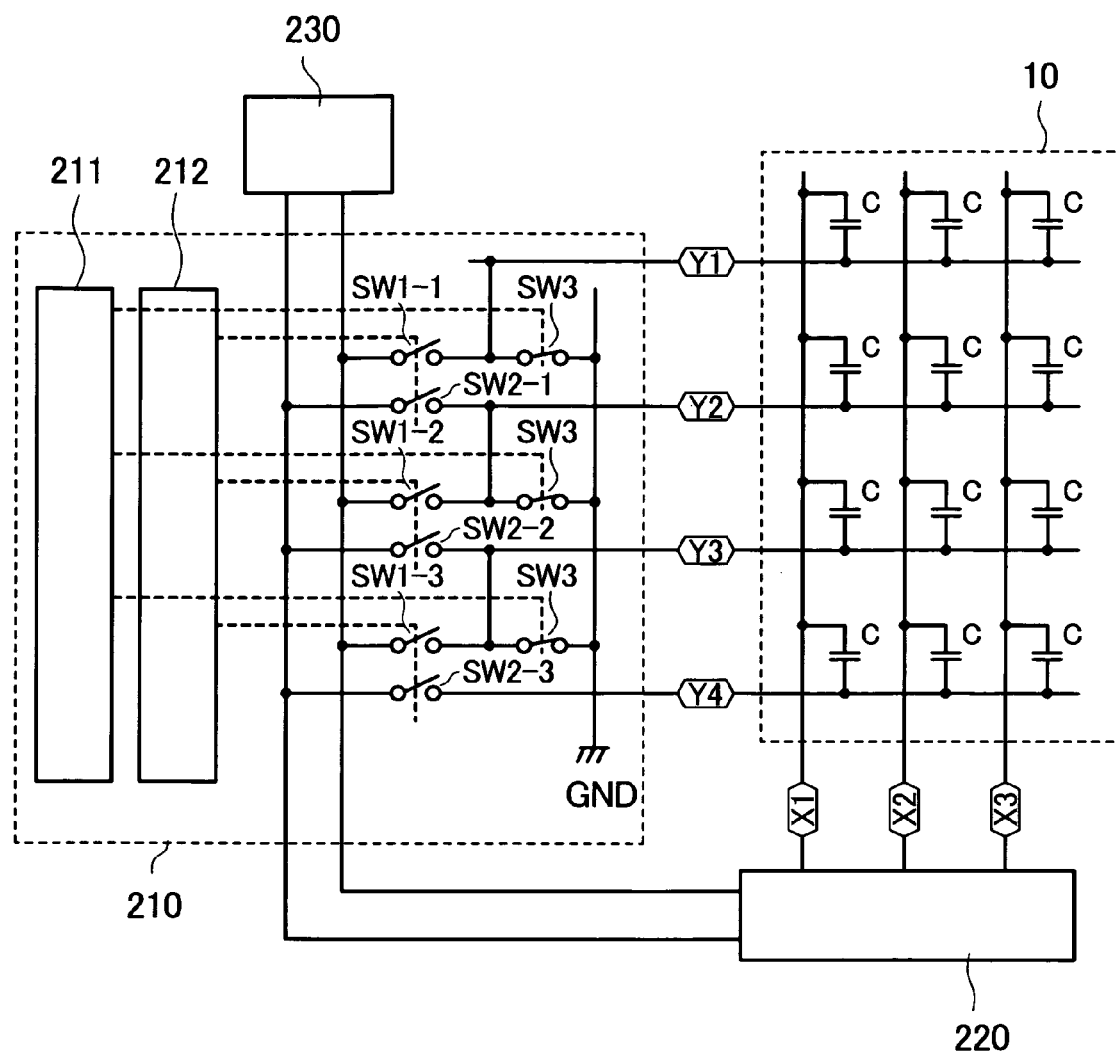
FIG. 11 is a block diagram showing the schematic structure of a touch panel used in a liquid crystal display device with touch panel according to a third embodiment of the present invention.

FIG. 11 is a block diagram showing the schematic structure of a touch panel used in a liquid crystal display device according to a third embodiment of the present invention.

In FIG. 11, reference numeral 10 denotes a touch sensor, 210 denotes a Y electrode selection circuit, 220 denotes an X electrode selection circuit, and 230 denotes a current detection circuit. The Y electrode selection circuit 210 and the X electrode selection circuit 220 have identical circuit configurations. However, in FIG. 11, only the circuit configuration of the Y electrode selection circuit 210 is shown.

The Y electrode selection circuit 210 and the X electrode selection circuit 220 have a scanning circuit 211 and a scanning circuit 212. The scanning circuit 212 turns off all switching elements SW3 in the period A and turns on all the switching elements SW3 in the period B.

The scanning circuit 211 sequentially controls, in a time division manner, ON and OFF of a switching element SW1 and a switching element SW2 corresponding to adjacent electrodes (Y electrodes or X electrodes) in the period A and turns off all switching elements SW1 and all switching elements SW2 in the period B. For example, in a first time division period of the period A, the scanning circuit 211 turns on a switching element SW1-1, turns on a switching element SW2-1, and turns off the remaining switching elements SW1 and SW2.

In the next time division period, the scanning circuit 211 turns on a switching element SW1-2, turns on a switching element SW2-2, and turns off the remaining switching element SW1 and SW2. Thereafter, the scanning circuit 211 selects the electrodes (the Y electrodes or the X electrodes) in the same manner.

Figure 13:
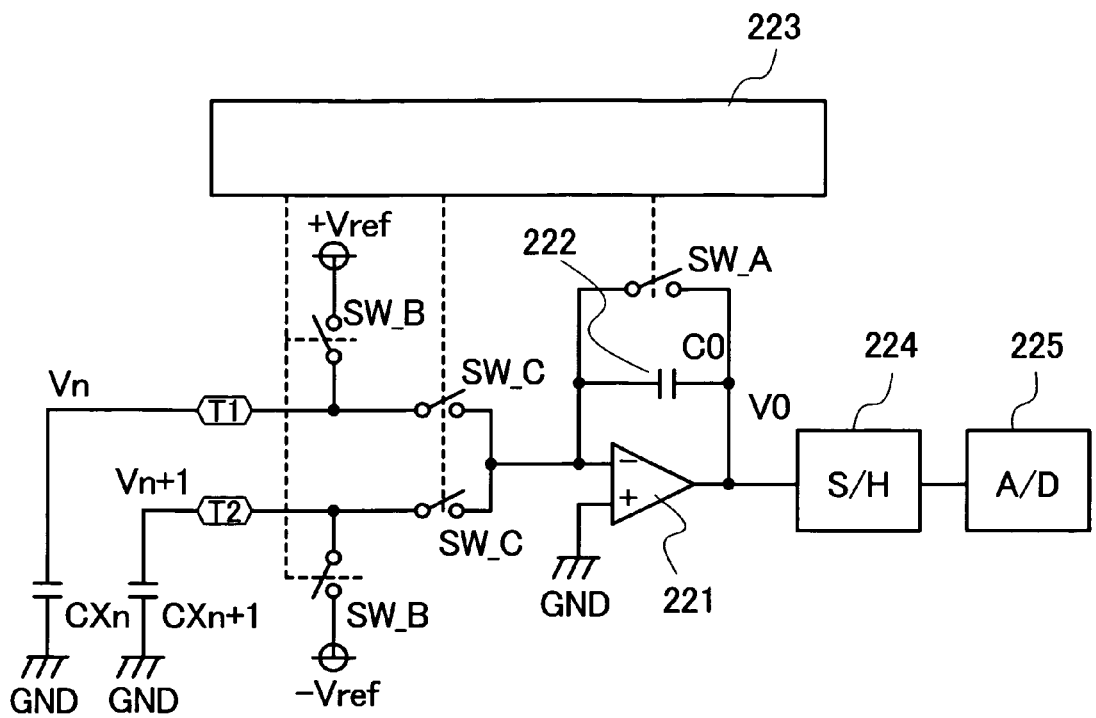
FIG. 13 is a diagram showing a current detection circuit shown in FIG. 11.

FIG. 13 is a diagram showing an example of the current detection circuit 230 shown in FIG. 11.

In FIG. 13, reference numeral 221 denotes an operational amplifier, 222 denotes an integral capacitor, 223 denotes a switch control circuit, 224 denotes a sample hold circuit, and 225 denotes an A/D conversion circuit. In FIG. 13, T1 and T2 denotes adjacent two electrodes of the X electrodes or the Y electrodes.

Figure 14:
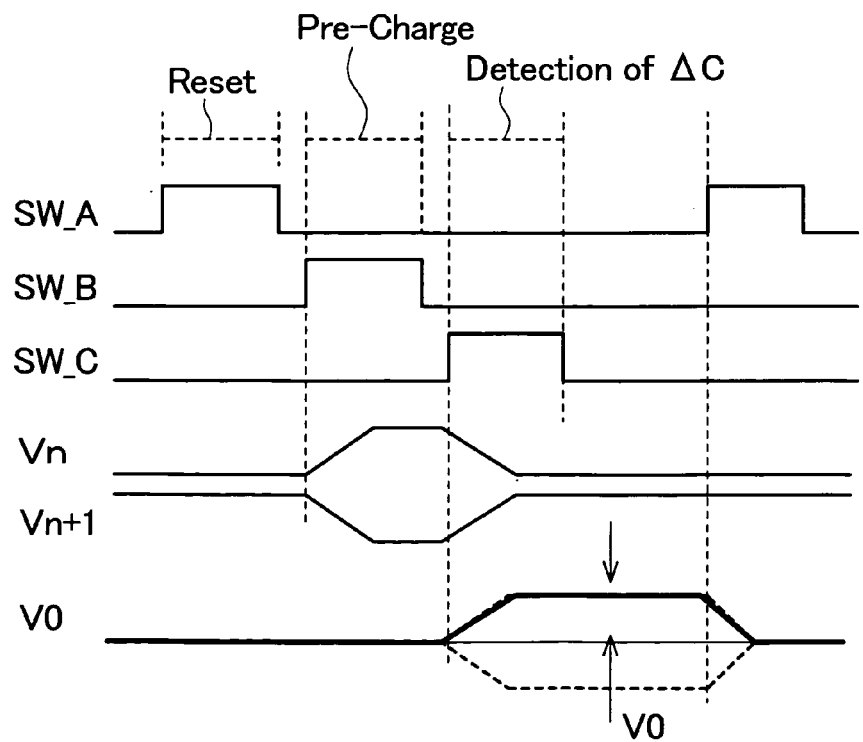
FIG. 14 is a time chart for explaining operations of the current detection circuit shown in FIG. 13.

FIG. 14 is a time chart for explaining operations of the current detection circuit 230 shown in FIG. 13. In the following explanation, assuming that electrodes Y1 and Y2 are connected to T1 and T2 in FIG. 13 (hereinafter, assumption A), operations of the current detection circuit 230 shown in FIG. 13 are explained.

In the case of the assumption A, the switching element SW1-1 is on, the switching element SW2-1 is on, the remaining switching elements SW1 and switching element SW2 are off, and all the switch elements SW3 are off in the Y electrode selection circuit 210.

All the switching elements SW1 and all the switching elements SW2 are off and all the switching elements SW3 are on in the X electrode selection circuit 220. A reference voltage (GND) is supplied to all the X electrodes.

As shown in FIG. 14, first, under the control by the switch control circuit 223, a switching element SW_A is turned on and the integral capacitor 222 are reset. Then, under the control by the switch control circuit 223, the switching element SW_B is turned on, a high potential (+Vref) positive polarity pulse having a voltage level higher than the reference voltage (GND) is supplied to the electrode Y1, and a low potential (−Vref) negative polarity pulse having a voltage level lower than the reference voltage (GND) is supplied to the electrode Y2. Thereafter, under the control by the switch control circuit 223, a switching element SW_C is turned on and a voltage Vo is obtained from an integration circuit including the operational amplifier 221 and the integral capacitor 222.

Vo is represented by the following equation (1):

$$Vo = Vref/Co \times (C_{n+1} - C_n) \quad (1)$$

where, Co is a capacitance value of the integral capacitor 222, $C_n$ is coupling capacitance between one of adjacent two Y electrodes (here, the electrode Y1) and all the X electrodes, and $C_{n+1}$ is coupling capacitance between the other of the adjacent two electrodes (here, the electrode Y2) and all the X electrodes. When adjacent two electrodes among the X electrodes are connected to T1 and T2 in FIG. 13, $C_n$ is coupling capacitance between one of the adjacent two X electrodes and all the Y electrodes and $C_{n+1}$ is coupling capacitance between the other of the adjacent two X electrodes and all the X electrodes.

In this way, current values detected in all the X electrodes are proportional to a capacitance difference between the coupling capacitance between one of the continuous two Y electrodes and all the X electrodes and the coupling capacitance between the other of the continuous two Y electrodes and all the X electrodes.

Therefore, in the period A, the reference voltage (GND) is supplied to all the X electrodes, adjacent two electrodes among the Y electrodes are sequentially selected in a time division manner, and a positive polarity pulse is supplied to one electrode and a negative polarity pulse is supplied to the other electrode. This makes it possible to detect a position of the Y electrodes on the touch sensor 10 touched by the finger of the observer.

Similarly, in the period B, the reference voltage (GND) is supplied to all the Y electrodes, adjacent two electrodes among the X electrodes are sequentially selected in a time division manner, a positive polarity pulse is supplied to one of the electrodes, and a negative polarity pulse is supplied to the other. This makes it possible to detect a position of the X electrodes on the touch sensor 10 touched by the finger of the observer.

Consequently, it is possible to detect a coordinate of a touch position on the touch sensor 10 touched by the finger of the observer. In this case, in this embodiment, it is possible to detect plural touch positions touched by the observer.

Figure 12:
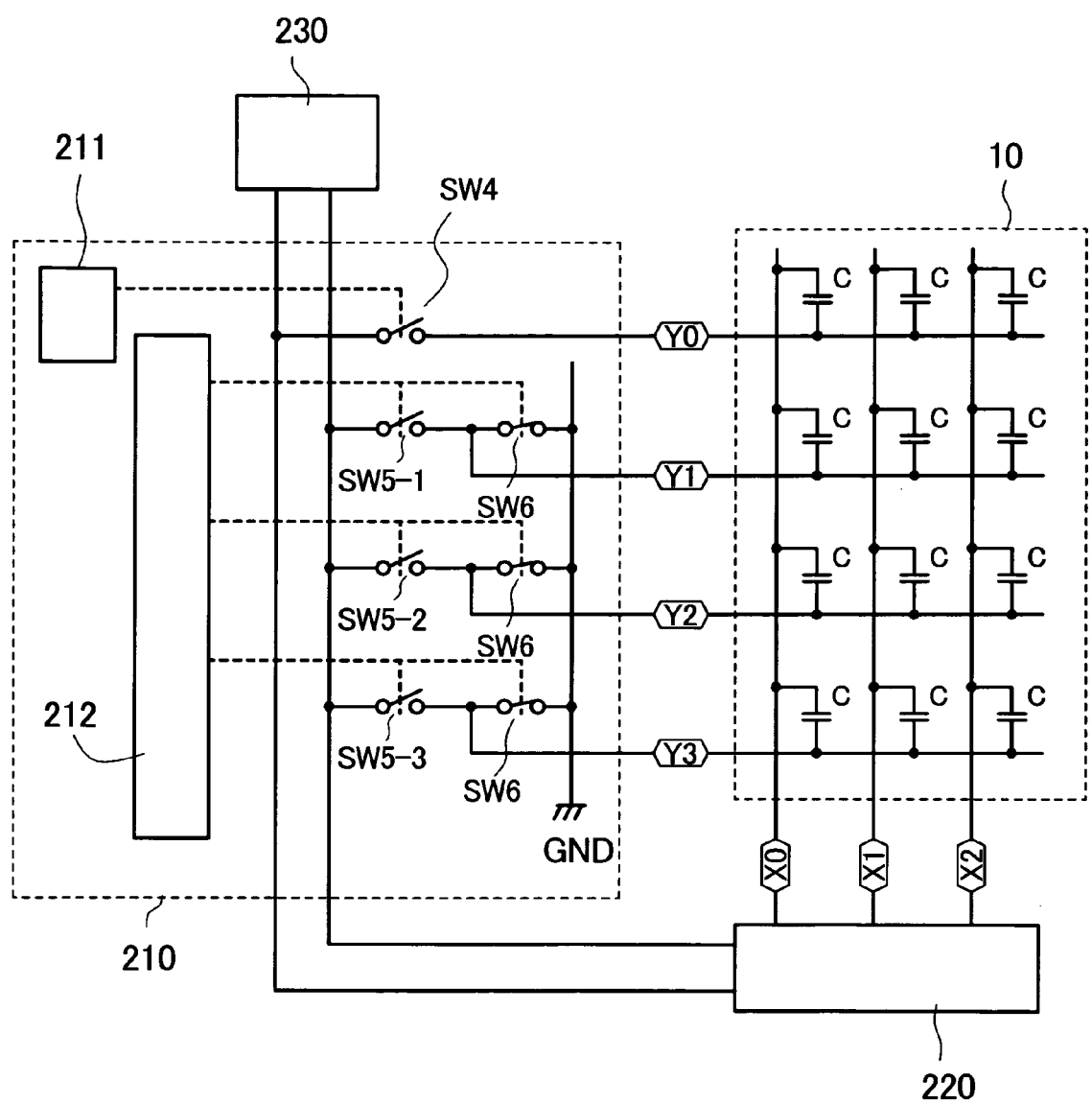
FIG. 12 is a block diagram showing a schematic structure of a modification of the touch panel used in the liquid crystal display device with touchpanel according to the third embodiment of the invention.

FIG. 12 is a block diagram showing the schematic structure of a modification of the touch panel according to the third embodiment. Although a coordinate detection circuit is provided at a post stage of the current detection circuit 230 shown in FIGS. 11 and 12, the coordinate detection circuit is not shown in FIGS. 11 and 12.

In this modification, a capacitance difference of coupling capacitances is detected between a reference electrode (in FIG. 12, an electrode Y0) and the other electrodes.

In the case of the touch panel shown in FIG. 12, the scanning circuit 211 turns on a switching element SW4 and supplies a positive polarity pulse (or a negative polarity pulse) to the electrode (in FIG. 12, the electrode Y0) in the period A and turns off the switching element SW4 in the period B.

The scanning circuit 212 sequentially turns on switching elements SW5 in a time division manner and turns off all switching elements SW6 in the period A and turns off all the switching elements SW5 and turns on all the switching elements SW6 in the period B. For example, the scanning circuit 211 turns on a switching element SW5-1, turns off the remaining switching elements SW5, and turns off all the switching elements SW6 in the first time division period of the period A. Consequently, the scanning circuits 212 supplies a negative polarity pulse to a first electrode (here, an electrode Y1) in this time division period.

In the next time division period, the scanning circuit 212 turns on a switching element SW5-2, turns off the remaining switching element SW5, and turns off all the switching elements SW6. Thereafter, in the same manner, the scanning circuit 212 selects an electrode (a Y electrode or an X electrode). Consequently, the scanning circuit 212 supplies a negative polarity pulse to a second electrode (here, an electrode Y2) in this time division period.

In this modification, as in the third embodiment, a voltage V'o is obtained from the integration circuit including the operational amplifier 221 and the integral capacitor 222. The voltage V'o is represented by the following equation (2):

$$V'o = Vref/Co \times (C_n - C_o) \quad (2)$$

where, Co is a capacitance value of the integral capacitor 222, $C_0$ is coupling capacitance between the reference electrode (here, the electrode Y0) and all the X electrodes, and $C_n$ is coupling capacitance between an nth electrode (here, the electrode Y1) and all the X electrodes.

In this way, in this modification, as in the third embodiment, current values detected in all the X electrodes are proportional to a capacitance difference between the coupling capacitance between the reference electrode (in FIG. 12, the electrode Y0) and all the X electrodes and the coupling capacitance between the other electrodes (in FIG. 12, the Y electrodes other than the electrode Y0) and all the X electrodes.

Therefore, in the period A, the reference voltage (GND) is supplied to all the X electrodes, a positive polarity (or negative polarity) pulse is supplied to the reference Y electrode, and a negative polarity (or positive polarity) pulse is supplied to the other Y electrodes in a time division manner. This makes it possible to detect a position of the Y electrodes on the touch sensor 10 touched by the finger of the observer.

Similarly, in the period B, the reference voltage (GND) is supplied to all the Y electrodes, a positive polarity (or negative polarity) pulse is supplied to the reference X electrode, and a negative polarity (or positive polarity) pulse is supplied to the other X electrodes in a time division manner. This makes it possible to detect a position of the X electrodes on the touch sensor 10 touched by the finger of the observer.

Consequently, it is possible to detect a coordinate of a touch position on the touch sensor 10 touched by the finger of the observer.

Figure 15A:
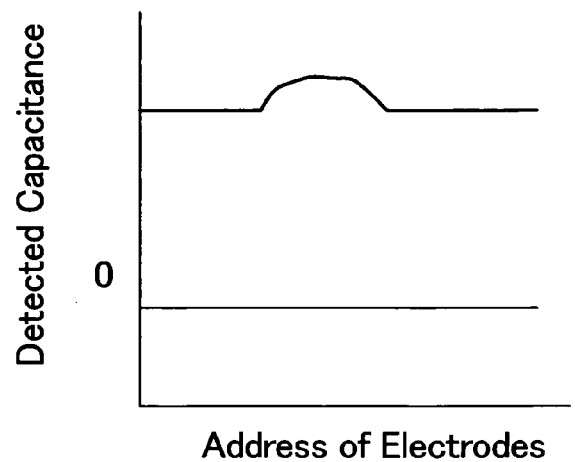
FIGS. 15A to 15C are diagrams showing a relation between detected capacitance detected by a method according to the third embodiment of the invention and an electrode address, a relation between detected capacitance detected by a method according to the modification of the third embodiment of the invention and an electrode address, and a relation between detected capacitance detected by a method in the past and an electrode address, respectively.
Figure 15B:
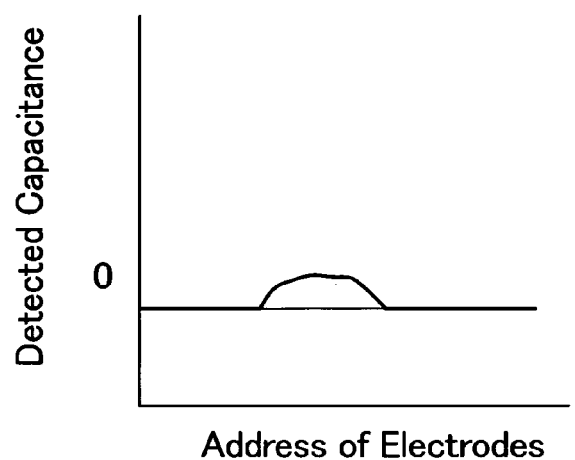
Figure 15C:
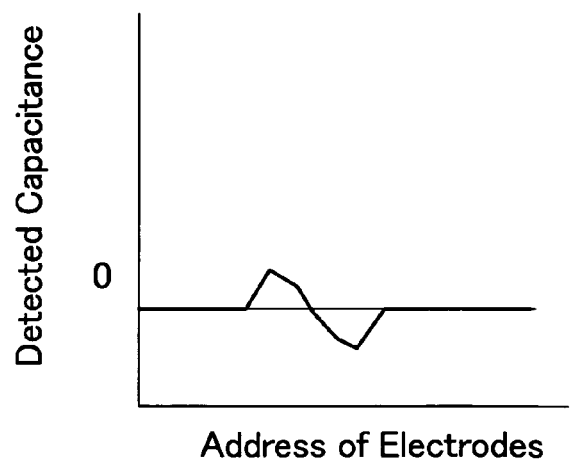

A relation between detected capacitance detected by the method disclosed in JP-A-8-16307 and an electrode address is shown in FIG. 15A. A relation between detected capacitance detected by the modification of this embodiment (the configuration shown in FIG. 12) and an electrode address is shown in FIG. 15B. A relation between detected capacitance detected by this embodiment (the configuration shown in FIG. 11) and an electrode address is shown in FIG. 15C.

As explained above, with the touch panel according to this embodiment, a capacitance difference of coupling capacitance between the X electrodes and the Y electrodes is detected. Therefore, it is possible to cancel parasitic capacitance between the X electrodes and the Y electrodes. As a result, it is possible to detect a coordinate of a touch position on the touch sensor 10 touched by the finger of the observer without being affected by fluctuation in parasitic capacitance between the X electrodes and the Y electrodes due to fluctuation in an arrangement caused in manufacturing and without being affected by fluctuation in parasitic capacitance between the X electrodes and the Y electrodes due to an external factor such as temperature.

As described in JP-A-8-16307, in the method of sequentially switching a demultiplexer and a multiplexer, it is possible to detect multipoint simultaneous inputs. However, coupling capacitance between the X electrodes and the Y electrodes, which should be detected, decreases. Coupling capacitance between the X electrodes and the Y electrodes at the time when the touch panel is touched decreases as the number of electrodes of the X electrodes and the Y electrodes is increased.

However, in this embodiment, it is possible to cancel parasitic capacitance between the X electrodes and the Y electrodes and detect smaller coupling capacitance between the X electrodes and the Y electrodes. Therefore, it is possible to realize a high-resolution touch panel having a larger number of electrodes.

In the above explanation, the embodiments in which the present invention is applied to the liquid crystal display device are explained. However, the present invention is not limited to this. For example, it is also possible to apply the present invention to display devices in general such as an organic electroluminescent display device.

The invention devised by the inventor has been specifically explained on the basis of the embodiments. However, it goes without saying that the present invention is not limited to the embodiments and various modifications of the embodiments are possible without departing from the spirit of the invention.

What is claimed is:

1. A display device with touch panel comprising:
a display panel; and
an electrostatic capacitance coupling type touch panel arranged on a surface on an observer side of the display panel,
the touch panel including:
plural first electrodes extending in a first direction;
plural second electrodes extending in a second direction different from the first direction;
a driving circuit;
a detection circuit; and
a coordinate-position calculating circuit that calculates a touch position on the touch panel touched by the observer, wherein
the driving circuit sequentially selects two first electrodes out of the plural first electrodes, supplies a high potential voltage higher than a reference voltage to a first selected first electrode of the selected two first electrodes, and supplies the reference voltage to a second selected first electrode of the selected two first electrodes,
the detection circuit selects at least one second electrode out of the plural second electrodes and detects a capacitance difference (A−B) between a capacitor A between a first selected second electrode of the at least one second electrode and the first selected first electrode to which the high potential voltage is supplied and a capacitor B between the first selected second electrode and the second selected first electrode to which the reference voltage is supplied, and
the coordinate-position calculating circuit calculates a touch position on the touch panel touched by the observer based on positions of the selected two first electrodes and the first selected second electrode and the capacitance difference (A−B).

2. A display device with touch panel according to claim 1, wherein the selected two first electrodes are adjacent electrodes of the first electrodes.

3. A display device with touch panel according to claim 1, wherein
the detection circuit has an integration circuit, and
the integration circuit integrates a current difference between an electric current flowing through the capacitor A and an electric current flowing through the capacitor B and outputs a voltage proportional to the capacitance difference (A−B).

4. A display device with touch panel according to claim 3, wherein
the detection circuit sequentially selects second electrodes in a time division manner, and
the integration circuit integrates a current difference between an electric current flowing through the capacitor A between the sequentially selected second electrodes and the first selected first electrode to which the high potential voltage is supplied and an electric current flowing through the capacitor B between the sequentially selected second electrodes and the second selected first electrode to which the reference voltage is supplied and outputs a voltage proportional to the capacitance difference (A−B).

5. A display device with touch panel according to claim 3, wherein
the detection circuit simultaneously selects the plural second electrodes,
the integration circuit is provided for each of the plural second electrodes, and
each of the integration circuits integrates a current difference between an electric current flowing through the capacitor A between the second electrode corresponding to each of the integration circuits and the first selected first electrode to which the high potential voltage is supplied and an electric current flowing through the capacitor B between the second electrode corresponding to each of the integration circuits and the second selected first electrode to which the reference voltage is supplied and outputs a voltage proportional to the capacitance difference (A−B).

6. A display device with touch panel comprising:
a display panel; and
an electrostatic capacitance coupling type touch panel arranged on a surface on an observer side of the display panel,
the touch panel including:
plural first electrodes extending in a first direction;
plural second electrodes extending in a second direction different from the first direction;
a driving circuit;
a detection circuit; and
a coordinate-position calculating circuit that calculates a touch position on the touch panel touched by the observer, wherein
the driving circuit sequentially selects, in a period A, two first electrodes out of the plural first electrodes, supplies a high potential voltage higher than a reference voltage to a first selected first electrode of the selected two first electrodes, and supplies the reference voltage to a second selected first electrode of the selected two first electrodes and sequentially selects, in a period B, two second electrodes out of the plural second electrodes, supplies the high potential voltage higher than the reference voltage to a first selected second electrode of the selected two second electrodes, and supplies the reference voltage to a second selected second electrode of the selected two second electrodes,
the detection circuit detects, in the period A, a capacitance difference (A−B) between a capacitor A between each of the second electrodes and the first selected first electrode to which the high potential voltage is supplied and a capacitor B between each of the second electrodes and the second selected first electrode to which the reference voltage is supplied and detects, in the period B, a capacitance difference (C−D) between a capacitor C between each of the first electrodes and the first selected second electrode to which the high potential voltage is supplied and a capacitor D between each of the first electrodes and the second selected second electrode to which the reference voltage is supplied, and
the coordinate-position calculating circuit calculates a touch position on the touch panel by the observer on the basis of the selected two first electrodes and the capacitance difference (A−B) and the selected two second electrodes and the capacitance difference (C−D).

7. A display device with touch panel according to claim 6, wherein the two first electrodes selected in the period A are adjacent electrodes of the first electrodes and the two second electrodes selected in the period B are adjacent electrodes of the second electrodes.

8. A display device with touch panel according to claim 6, wherein
the detection circuit has an integration circuit, and
the integration circuit integrates, in the period A, a current difference between an electric current flowing through the capacitor A and an electric current flowing through the capacitor B and outputs a voltage proportional to the capacitance difference (A−B) and integrates, in the period B, a current difference between an electric current flowing through the capacitance C and an electric current flowing through the capacitor D and outputs a voltage proportional to the capacitance difference (C−D).

9. A display device with touch panel comprising:
a display panel; and
an electrostatic capacitance coupling type touch panel arranged on a surface on an observer side of the display panel,
the touch panel including:
plural first electrodes extending in a first direction;
plural second electrodes extending in a second direction different from the first direction;
a first electrode selection circuit;
a second electrode selection circuit;
a detection circuit; and
a coordinate-position calculating circuit that calculates a touch position on the touch panel touched by the observer, wherein
the first electrode selection circuit sequentially selects, in a period A, two first electrodes out of the plural first electrodes, supplies a high potential positive polarity pulse having a voltage level higher than a reference voltage to a first selected first electrode of the selected two first electrodes, and supplies a low potential negative polarity pulse having a voltage level lower than the reference voltage to a second selected first electrode of the selected two first electrodes,
the second electrode selection circuit sequentially selects, in a period B, two second electrodes out of the plural second electrodes, supplies a high potential positive polarity pulse having a voltage level higher than the reference voltage to a first selected second electrode of the selected two second electrodes, and supplies a low potential negative polarity pulse having a voltage level lower than the reference voltage to a second selected second electrode of the selected two second electrodes,
the detection circuit detects, in the period A, a capacitance difference (A−B) between a capacitor A between each of the second electrodes and the first selected first electrode to which the positive polarity pulse is supplied and a capacitor B between each of the second electrodes and the second selected first electrode to which the negative polarity pulse is supplied and detects, in the period B, a capacitance difference (C−D) between a capacitor C between each of the first electrodes and the first selected second electrode to which the positive polarity pulse is supplied and a capacitor D between each of the first electrodes and the second selected second electrode to which the negative polarity pulse is supplied, and
the coordinate-position calculating circuit calculates a touch position on the touch panel by the observer on the basis of the selected two first electrodes and the capacitance difference (A−B) and the selected two second electrodes and the capacitance difference (C−D).

10. A display device with touch panel according to claim 9, wherein the two first electrodes selected in the period A are adjacent electrodes of the first electrodes and the two second electrodes selected in the period B are adjacent electrodes of the second electrodes.

11. A display device with touch panel according to claim 9, wherein the first selected first electrode serves as a reference the first selected second electrode serves as a reference.

12. A display device with touch panel according to claim 9, wherein
the first electrode selection circuit supplies the reference voltage to each of the first electrodes in the period B, and the second electrode selection circuit supplies the reference voltage to each of the second electrodes in the period A.

13. A display device with touch panel according to claim 9, wherein the detection circuit has an integration circuit, and the integration circuit integrates, in the period A, a current difference between an electric current flowing through the capacitor A and an electric current flowing through the capacitor B and outputs a voltage proportional to the capacitance difference (A−B) and integrates, in the period B, a current difference between an electric current flowing through the capacitor C and an electric current flowing through the capacitor D and outputs a voltage proportional to the capacitance difference (C−D).

14. A display device with touch panel according to claim 3, wherein the detection circuit has an A/D conversion circuit connected to a post stage of the integration circuit.

15. A display device with touch panel according to claim 8, wherein the detection circuit has an A/D conversion circuit connected to a post stage of the integration circuit.

16. A display device with touch panel according to claim 13, wherein the detection circuit has an A/D conversion circuit connected to a post stage of the integration circuit.

17. A display device with touch panel according to claim 1, wherein each of the first electrodes has a wide electrode pattern between adjacent two second electrodes, and each of the second electrodes has a wide electrode pattern between adjacent two first electrodes.

18. A display device with touch panel according to claim 10, wherein the first electrode selection circuit supplies the reference voltage to each of the first electrodes in the period B, and the second electrode selection circuit supplies the reference voltage to each of the second electrodes in the period A.

19. A display device with touch panel according to claim 11, wherein the first electrode selection circuit supplies the reference voltage to each of the first electrodes in the period B, and the second electrode selection circuit supplies the reference voltage to each of the second electrodes in the period A.

* * * * *